United States Patent
Jangbarwala

(12) 
(10) Patent No.: US 9,211,499 B2
(45) Date of Patent: Dec. 15, 2015

(54) COMPOSITE POROUS DEHUMIDIFYING MATERIAL FOR AN HVAC

(71) Applicant: World Environmental Solutions Pty Limited, Belrose, New South Wales (AU)

(72) Inventor: Juzer Jangbarwala, Chino Hills, CA (US)

(73) Assignee: World Environmental Solutions, Belrose (AU)

( * ) Notice: Subject to any disclaimer, the term of this patent is extended or adjusted under 35 U.S.C. 154(b) by 0 days.

(21) Appl. No.: 13/897,429

(22) Filed: May 19, 2013

(65) Prior Publication Data

US 2013/0309927 A1    Nov. 21, 2013

Related U.S. Application Data

(60) Provisional application No. 61/649,221, filed on May 18, 2012.

(51) Int. Cl.
| | |
|---|---|
| C04B 41/81 | (2006.01) |
| B01D 53/28 | (2006.01) |
| B01J 20/26 | (2006.01) |
| B01J 20/28 | (2006.01) |
| F24F 3/14 | (2006.01) |

(52) U.S. Cl.
CPC .............. B01D 53/28 (2013.01); B01J 20/267 (2013.01); B01J 20/28038 (2013.01); B01J 20/28047 (2013.01); F24F 3/1411 (2013.01); B01D 2253/202 (2013.01)

(58) Field of Classification Search
CPC .... B01D 29/00; B01D 2239/00; B01D 53/28; B60K 2025/005; B60K 2025/024; B60W 2510/0638; B60W 2510/244; B60W 2710/0644; B60W 2710/083; Y02T 10/6286; H02P 7/00; E02F 9/2075
USPC ............... 442/6, 19, 20, 21, 52, 76, 110, 111, 442/117, 118, 119, 320, 370, 374, 376, 377, 442/394; 428/913, 304.4, 305.5, 311.51, 428/313.9, 317.3, 319.3, 332, 333, 365, 428/368; 318/454
See application file for complete search history.

(56) References Cited

U.S. PATENT DOCUMENTS

| | | | | |
|---|---|---|---|---|
| 4,074,039 | A * | 2/1978 | Lim et al. ...................... | 526/306 |
| 4,828,710 | A * | 5/1989 | Itoh et al. ...................... | 210/675 |
| 7,258,797 | B2 * | 8/2007 | Burton et al. .................. | 210/689 |
| 8,057,567 | B2 * | 11/2011 | Webb et al. ..................... | 55/486 |
| 2003/0049435 | A1* | 3/2003 | Haddad et al. ................ | 428/328 |
| 2005/0126984 | A1* | 6/2005 | Scheper et al. ............... | 210/435 |

* cited by examiner

Primary Examiner — Arti Sing-Pandey
(74) Attorney, Agent, or Firm — Henry E. Naylor

(57) ABSTRACT

A composite porous fibrous dehumidifying material comprised of a plurality of fibers whose surface has immobilized thereon a reversible hydrogel material. The composite porous fibrous structure can be used as a dehumidifying material for reducing energy consumption in air conditioning/climate control units. Preferred fibrous materials are electrically conductive materials, such a graphitic fibers.

7 Claims, 4 Drawing Sheets

Composite Porous Substrate

HVAC Filter

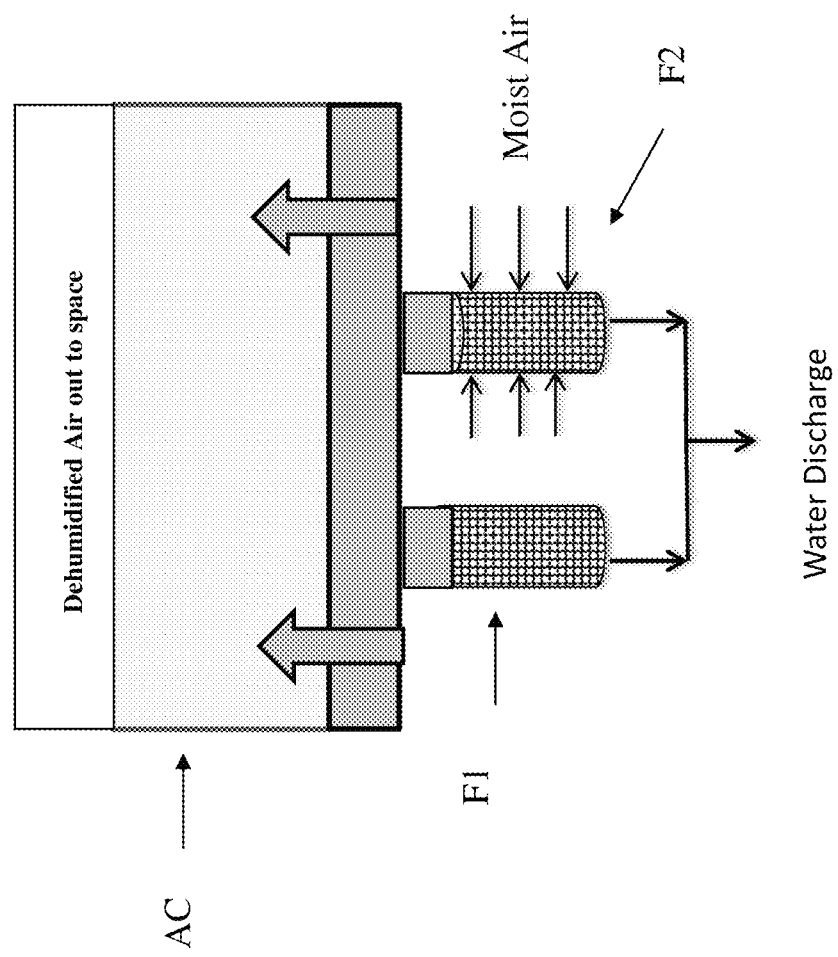

COMPOSITE POROUS DEHUMIDIFYING MATERIAL FOR AN HVAC

CROSS-REFERENCE TO RELATED APPLICATIONS

This application is based on Provisional Application 61/649,221 filed May 18, 2012.

FIELD OF THE INVENTION

This invention relates to a composite porous fibrous dehumidifying material comprised of a plurality of fibers whose surface has immobilized thereon a reversible hydrogel material. The composite porous fibrous structure can be used as a dehumidifying material for reducing energy consumption in air conditioning/climate control units. Preferred fibrous materials are electrically conductive materials, such a graphitic fibers.

BACKGROUND OF THE INVENTION

A considerable amount of work has been done over the years to remove water from air, some of which have resulted in commercial success. Various reasons exist for humidity removal from ambient air, some of which include the need: a) for reducing discomfort by reduction of sensible heat; b) for maintaining commercial storage places; c) for extracting water from the atmosphere for drinking and consumption; and d) for reducing energy input for climate control units.

There are several conventional methods for removing vapor, particularly water vapor, from a gaseous stream. One method is to cool the gas stream to condense the vapor. When air is cooled below its dew point temperature, moisture condenses on the nearest surface. The process of cooling and condensation thus dehumidifies the air. Most commercial and residential air conditioning systems operate this way. Typically, a refrigeration system cools air, drains some of its moisture as condensate, and sends the drier air back to a space to be cooled. The system essentially pumps the heat from the dehumidified air to a different air system in another location, by using refrigerated gas to carry the heat.

Another method is to contact the gaseous stream with a desiccant capable of pulling water vapor out of the gas stream by a difference in vapor pressures. Desiccant dehumidifiers, instead of cooling the air to condense moisture, attract moisture from the air by creating an area of low vapor pressure at the surface of the desiccant. The pressure exerted by the vapor in the air is higher, so the vapor molecules move from the air to the desiccant, which is typically a layered, hydrophilic alumina silicate matrix that can tie up "liquid" phase water, resulting in dehumidifying the air. Hence, for a desiccant to work, there must be a phase change of the water. Desiccant dehumidifiers make use of changing vapor pressures relative to dry air in a repeating cycle.

While the above methods have met with commercial success, they unfortunately require large amounts of energy to extract the latent heat of water from air, thus hardly making a difference in reducing the load on the cooling requirement of an air conditioning unit. Therefore, there remains a need in the art for the extraction of water from ambient air in a more energy efficient manner.

SUMMARY OF THE INVENTION

In accordance with the present invention there is provided a composite porous fibrous dehumidifying material comprised of a plurality of fibers having immobilized thereon a reversible hydrogel material that is capable of absorbing water from moisture-containing air and which is capable of releasing at least a fraction of the absorbed water upon being subjected to an external stimulus.

In a preferred embodiment the external stimulus is selected from a temperature change, pH change, electric field, light intensity and wavelength, pressure change and ionic strength change In a preferred embodiment the porous fibrous substrate is comprised of electrically conductive fibers, preferably graphitic fibers.

In another preferred embodiment the porous fibrous substrate is in the form of a mat.

In yet another preferred embodiment the porous fibrous substrate is a filter for air conditioning equipment.

BRIEF DESCRIPTION OF THE FIGURES

FIG. 5 hereof is a representation of two composite porous fibrous materials of the present invention having a hydrogel immobilized thereon in cylindrical form positioned at the air intake of an air conditioning unit.

DETAILED DESCRIPTION OF THE INVENTION

Figure 1:
FIG. 1 hereof shows a composite porous fibrous substrate material of the present invention in the form of a mat.
Figure 2:
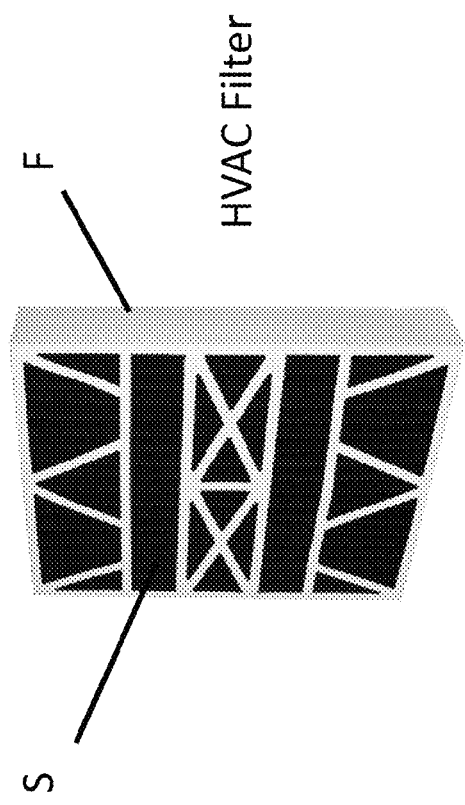
FIG. 2 hereof is a representation of the mat S held in a frame F of suitable construction material that is used as an HVAC filter.
Figure 4:
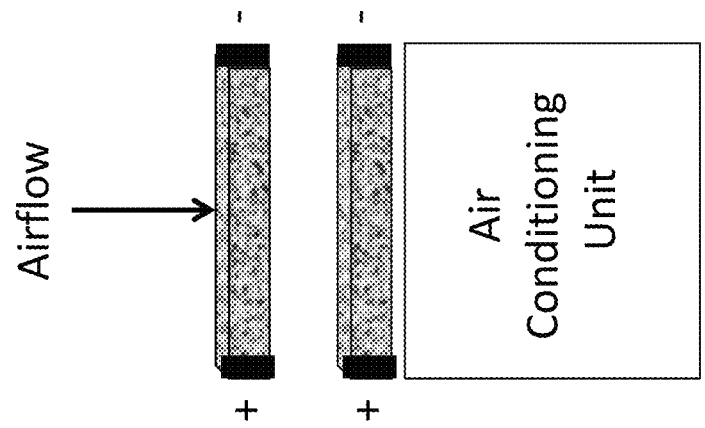
FIG. 4 hereof is a representation of two mats of FIG. 3 hereof positioned in series at the air intake of an air conditioning unit to remove moisture from incoming air.
Figure 3:
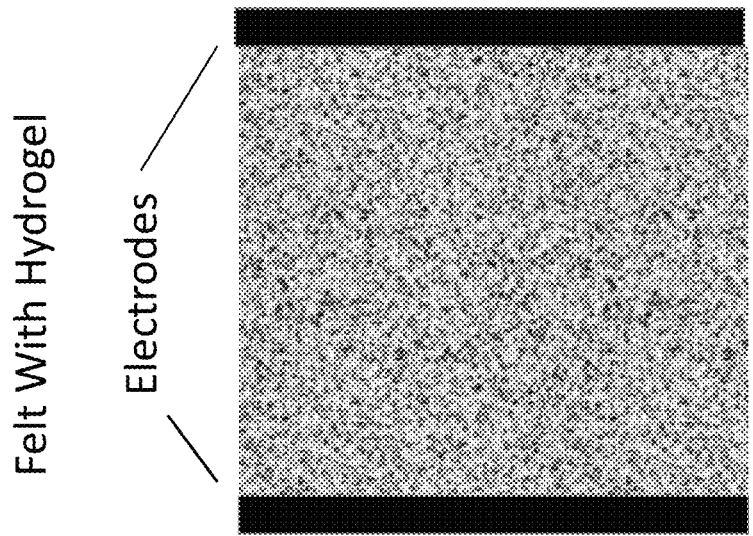
FIG. 3 hereof is a representation of a composite porous fibrous mat of the present invention having a reversible hydrogel immobilized thereon in the form of rectangular mat and having an electrode along opposing sides to deliver a current to the mat to trigger the hydrogel to release at least a fraction of any absorbed water.

One object of the present invention is to provide a composite porous fibrous substrate onto which is immobilized an effective amount of a reversible hydrogel that can maintain the porosity of the substrate during it's swollen state and that can be regenerated in situ by only applying an external stimulus, such as an electric current. Another object of the present invention is to provide a means to reduce the energy consumption of an air cooling or air conditioning device by pre-treating the air to be conditioned with a universally applicable water extraction device that can reversibly extract water from a moisture laden air source, at ambient temperatures up to the lower critical solution temperature (LCST) of the hydrogel used, and at high space velocities sufficient to satisfy commercial HVAC equipment air flow rates. The extraction media should perform without using any significant amount of energy for regeneration. As is well known in the field of HVAC and air conditioning, humidity reduction in ambient air reduces the energy required for conditioning the air for comfort and process.

The instant porous fibrous substrate having immobilized hydrogel polymer utilized for water extraction is also regenerable by use of waste heat generated by the airconditioning or cooling mechanism. It's performance is repeatable for multiple cycles, the number of which can be determined on commercial evaluations of the intended device.

The dehumidification system of the present invention is substantially different from conventional dehumidification systems. Conventional methods of air conditioning and dehumidification, such as compression and the use of desiccants, are inefficient and cause copious amounts of unnecessary greenhouse gas emissions. The system of the present invention relates to the use of reversible hydrogels. A critical difference between the hydrogel system of the present invention and a desiccant system is that in order for the hydrogel to disgorge the liquid trapped in it's network, it needs to be subjected to only a small external stimulus, such as being heated to only a temperature slightly above it's critical point, not to the boiling point of water, as is the case with desiccants. The hydrogel undergoes a rapid and reversible, discontinuous phase transition by collapsing and disgorging liquid water. On the other hand, a desiccant absorbs water vapor and traps it as a liquid, but can only be regenerated by driving the liquid water off as vapor, by creating a high vapor pressure zone on the surface of the desiccant with relation to the surrounding air vapor pressure, thus releasing moisture to the heated, low relative humidity air of regeneration. The hydrogel system of the present invention, by contrast, traps water vapor by actually forming hydrogen bonds and polar interactions, reacting with the vapor and acting as a liquid. During regeneration, the hydrogel disgorges liquid water, and not requiring any phase change of water. The energy savings in this manner and the reduced load on the air conditioning system for cooling the dehumidified air are very significant.

Hydrogels are three-dimensional networks of cross-linked hydrophilic polymers that become swollen, up to about 400% its' original volume, when exposed to water. More specially, the present invention relates immobilizing a reversible hydrogel material on a porous fibrous structure, such as a mat or felt. The present invention also relates to a porous fibrous substrate having immobilized thereon a reversible hydrogel material which will sometimes be referred to as a composite porous fibrous substrate, or structure. Another embodiment of this invention is an air conditioning unit, or chiller, which incorporates the use of a composite porous fibrous substrate for efficiently removing water from air.

The resulting composite porous fibrous structure can undergo regeneration by an external stimuli, non-limiting examples of which include: temperature change, pH change, electric field, light intensity and wavelength, pressure change and ionic strength change. Preferred external stimuli are low energy input, such as waste heat or a flow of electrical current. The reversible hydrogels utilized in the present invention undergo discontinuous volume phase transition behavior. They can be comprised of a single polymer that meets both the sorptive and regenerative requirements. An exemplary material is NIPA (poly-N isopropylacrylamide. It may also have multiple polymers, such as an absorptive component such as poly(methacrylamideopropyl-methoammonium-chloride) and an interpenentrating network of polymers as the regenerative component.

The hydrogels of the present invention are preferably comprised of two primary components—at least one sorption polymer component capable of the sorption of water vapor into liquid in combination with a phase transition component comprised of two or more interpenetrating polymers. The hydrogel will collapse by giving up at least a fraction of water absorbed under a trigger environmental condition, such as a specific range of temperature, for example a temperature range of about 60° to 80° C., and expands to up to about 400% it's original volume under a second trigger environmental condition, such as ambient temperature of about 15° to 50° C.

The hydrogel can be thought of deliquescing when it absorbs moisture. That is, it forms bonds with water molecules and resembles a liquid. This sorbent polymer may be immobilized by either an interpenetrating polymer matrix (described below) or by reacting one part of the molecule with a reactive substrate, as in the case of the graphitic fibers of the present invention. The sorption polymer is typically entrapped in a phase changing interpenetrating network of polymers, which operate in the critical temperature range of their phase diagram. The polymer network will contract above it's design critical temperature, while it will expand if required by the water absorption of the absorption polymer, below it's critical temperature. Hence, by design, if the critical temperature is above ambient temperature, the sorption polymer will react with water and will have room to accommodate the larger resulting molecule because the phase changing polymer network will expand. However, when the critical temperature is reached or passed, the phase change material contracts sharply, disgorging the absorbed water.

At least one polymer of hydrogel material, preferably the sorption component, will be capable of reacting with vapor phase water wherein the hydrogel will expand in volume. The entire system will then be capable of deliquescing upon a given environmental change and give up water and shrink in volume. Once the sorption polymer has absorbed its capacity of moisture, or the polymer matrix has expanded to its' limits, an external stimulus can reverse the conditions essentially regenerating the system. If the end of the absorption cycle has been reached due to the saturation of the reactive sites in the sorption polymer, an external stimulus such as an electronic perturbation via an electrical current, can reverse the reactivity and disgorge the water. If the capacity has been exhausted due to the expansion capability of the polymer network, then an external stimulus, such as rising temperature or also an electric current, makes the network go through a phase change and contract substantially, disgorging the water trapped in the sorption polymer due to change in conditions created by the severe contraction such as pressure. Hence, as a system, the sorption, and phase transition components expand as the sorbent absorbs water vapor, and disgorges the entrained liquid as result of an electrical current or as the temperature is raised by a small amount, such as by only about 10° to about 20° C. The energy needed to raise the local temperature of the hydrogel is provided by the porous substrate that can be made selectively less conductive by adding resistive materials, depending on the temperature rise desired. Non-limiting resistive materials that can be used in the practice of the present invention include ceramic fibers and even the polymers of the hydrogel themselves.

The only thing required for the reversible hydrogels deliquesce, then to release the absorbed water is that the ambient temperature be raised above their critical temperature, a point at which the phase transition network of the reversible hydrogels collapses, and there is severe contraction. This is achieved without the need to supply the latent heat of phase change required by desiccants. Conventional desiccants are commercially available for reducing the moisture content of ambient air intended for cooling or air conditioning. However, conventional desiccants require the heat of vaporization of water, or they need an unsaturated air stream at high temperature in order to regenerate. Reversible thermogels, in general, thus provide an ability to recover the water by use of only a relatively mild external stimulus. It will be understood that a hydrogel can be designed to respond to any one or more of these trigger external stimuli. Non limiting examples of reversible hydrogels that can used in the practice of the present invention include those disclosed in U.S. Pat. No. 4,074,039 which discloses N,N-Diethyl acrylamide copolymers and U.S. Pat. No. 4,828,710 that discloses a family of acrylamides (N-alkyl or N-alkalene substituted) and methacrylamides.

U.S. Pat. No. 5,565,139 describes a hydrogel comprised of a poly(methacrylamideopropyl-methoammoniumchloride) composition that has characteristics desired by the present invention, but lacks the fast kinetics and rapid regeneration required for commercial viability. Only with the unique composite hydrogel porous fibrous substrate of the present invention can commercial viability be met. That is, without the present invention's unique approach to maintain high porosity of the hydrogel during the swollen state and the simple ability to trigger a select environmental condition, such as passing an electric current through or slightly raising the temperature of such a porous structure to regenerate the hydrogel. Conventional hydrogels, such as those taught in U.S. Pat. No. 5,565,139 are very slow to respond as soon as they swell, and thus are unsuitable for dehumidification where continuous operation at high space velocities is needed. Use of the instant invention allows a reversible hydrogel material to be immobilized on the fibrous substrate in a form so thin that the absorbed water has very little distance to travel to the inner part of the hydrogel. The thickness of the hydrogel layer will typically be from about 0.01 to 1000 microns, preferably from about 0.01 to 500 microns, and more preferably from about 0.01 to 200 microns.

Water absorption is a function of saturation, so if the surface is saturated, the absorbed water from the surface has to travel towards the center first before the surface can absorb more water. Such kinetics can be controlled by increasing the surface area of the gels, with very little depth needed for the water to travel. Similarly, if the gel is to be heated to trigger the release of water, one would notice a thermal insulation barrier between the heat source and the absorbed water. The very thin thickness achieved by the instant invention is in the nanometer range, thus increasing the kinetics by orders of magnitude. Further, space velocity is a value determined by dividing the volume of the absorption media by the volumetric flow rate of the gas containing the target component to be absorbed, in this case water vapor. In will be noted that the absorption kinetics of all families of hydrogel type polymers will be significantly improved by immobilizing them on the porous fibrous substrates of the present invention preferably by in-situ polymerization or in situ crosslinking. The present invention provides a much larger surface area with an equivalent amount of volume compared to conventional hydrogel technology, thus increasing the speed at which water vapor can be absorbed.

A hydrogel that is thermally responsive at a temperature higher than it's LCST, at which point it will release the moisture adsorbed and shrink can be prepared from the many suitable polymers known in the hydrogel art. Typically, these gels are water soluble until they are crosslinked. Non-limiting examples of such water soluble polymers include poly(acrylamide), poly(N-methylacrylamide), poly(N-ethylacrylamide), poly(cyclopropylacrylamide), poly(N-isopropylacrylamide), poly(methacrylamide), poly(N-methylmethacrylamide), poly(cyclopropylmethacrylamide), poly(N-isopropylmethacrylamide), poly(dimethylacrylamide), poly(N,N-dimethylaminopropylacrylamide, poly(N-methyl-N-ethylacrylamide), poly(N-methyl-N-isopropylacrylamide), poly(N-methyl-N-ethylacrylamide), poly(N-methyl-N-isopropylacrylamide), poly(N-methyl-N-n-propylacrylamide), poly(N,N-diethylacrylamide) poly(N-acryloylpyrrolidine), poly(N-acryloylpiperidine), poly(N-acryloylmethylhomopiperidine), poly(N-acryloylmethylpiperidine), and poly(N-acryloylmethylpiperidine). It will be noted that the exact composition of the hydrogels used in the practice of the present invention is not critical to achieve for the functional superiority provided by the present invention Any hydrogel can be used that will swell by absorbing moisture and that can reverse it's swelling beyond it's critical temperature, or by use of a relatively mild change of at least one environment condition.

The hydrophilic poly(acrylamide) family of hydrogels can be copolymerized with hydrophobic esters of unsaturated polysaccharide derivatives (cyclodextrin acrylate/N-isopropylacrylamide) in varying proportions to increase the critical temperature of hydrogels. In one embodiment, Xanthan gum can be partially functionalized by esterification with maleic anhydride and copolymerized with a known temperature sensitive precursor (N-isopropylacrylamide) and water-swollen hydrogels with interpenetrating polymer networks (IPN) can be obtained. These copolymers will exhibit critical temperatures of 37° to 40° C., which is suitable for the present invention, and such similar combinations of polysaccharides and hydrogels are incorporated herein as a reference.

In a preferred embodiment of the present invention, a porous fiber substrate is preferably comprised of graphitic fibers, or any other electrically conductive fiber. Although porous fibrous electrically conductive substrates are preferred, such as graphitic fibers, any other suitable fiber material can be used that can withstand the conditions of their intended use, such as in dehumidifying equipment, such as air conditioning systems and chillers. Other non-limiting example of suitable fiber materials include carbon fibers, other than graphitic carbon, ceramic fibers, and metallic and semi metallic fibers. The porous substrate will preferably have a fiber content between about 70 percent and 99.9 percent, more preferably between about 90 and about 99.9%, and more preferably between about 98 and about 99.9%. The thermal conductivity (@ 50° C.) of the porous substrate is preferably between about 0.04 to 0.80 W/m*° K and will also preferably have a tensile strength of about 0.05 to about 0.30 N/m and an electrical resistivity (at 20° C.) of about 200-300 ohm*cm.

In a preferred embodiment, the porous fibrous substrate, preferably comprised of a graphitic fibers in a formed shape, such as a rectangular mat, disk, cylinder etc. is treated with a wetting agent to make the fibers hydrophillic. The fibrous substrate of as felt or mat, is then immersed in a dilute aqueous solution of the monomer of the reversible hydrogel. The solution is then exposed to a crosslinking agent, initiator and/or catalyst such that the desired polymer forms on the surface of the fibers. The amount or thickness of the immobilized hydrogel can be controlled by the concentration of the various components. It will be understood that the amount of hydrogel immobilized on the porous substrate of the present invention will be an effective amount. That is, there needs to be enough hydrogel on the substrate surface to effectively remove a predetermined amount of water from air in a predetermined amount of time. The amount and time may vary depending on the overall moisture content of the air and the size of the area to be dehumidified. There cannot be so much hydrogel on the substrate to adversely affect the flow of air through the substrate. The amount of substrate surface that will be covered with hydrogel in accordance with the present invention will typically range from about 0.1 to 50%, preferably from about 20 to 40%, and more preferably from about 25 to 35%. Thus, when choosing what polymers to use for the hydrogels of the present invention things such as low volume increase versus high water sorption need to be considered. High swelling could cause too much obstruction of the porosity of the substrate and needs to be avoided.

In another embodiment, the fibers are conditioned in a strong mineral acid such as nitric, sulfuric or hydrochloric acid. The concentration of the mineral acid for such treatment is from about 0.5% by weight to 98% by weight, preferably from about 2 to about 20% by weight, and more preferably from about 5 and 10% by weight. The acid treatment will functionalize the edges of the graphite with —OOH and —OH groups. The functionalized fiber surface can then be used to first immobilize a sorptive component without the polymer network, catalyst, an initiator or a crosslinking agent.

In yet another embodiment, the fibers are heat treated in the absence of air with ammonia gas to functionalize the fiber surface with $NH_2$ (amide groups). The functionalized fiber surface may then be used to first immobilize the sorptive component, a catalyst, an initiator or a crosslinking agent. Non-limiting examples of suitable initiators and crosslinking agents that can be used in the practice of the present invention include: N,N'Bisacrylamide, N,N'-BIS(ACRYLOYL)-CYSTAMINE, ethylenediamine, 1,3-propanediamine, 1,3-propanedithiol, dithiothreitol, dithioerythritol, 1,5-pentanediamine, hexamethylenediamine, diethylenetriamine, triethylenetetramine, propylenediamine, di(aminomethyl) ether, 1,8-diamino-4-(aminomethyl)octane, xylylenediamine, hydroquinone, bisphenol A, bisphenol sulfone, 1,4-butanedisulfinic acid, benzenedisulfinic acid, thioethanolamine, p-aminothiophenol, and butylenediamine. (crosslinking agents), Ammonium persulfate, Potassium Persulfate (initiator) Tetramethylenediamine (accelerator otherwise called catalyst), transition metal ions can also act as catalysts.

It will be evident to those skilled in the art that due to the rough and high surface area nature of graphitic and carbonaceous surfaces, and the availability of $sp^2$ electrons upon heating, such surfaces may be used as anchors for either components, catalysts, initiators or crosslinking agents for the in situ formation of the desired gels. These activated sites can now be used to attach, or immobilize, the hydrogels on a molecular level to the porous substrate, preferably a porous graphitic structure. There is more than one way to immobilize the hydrogels to a substrate of the present invention. Non-limiting examples of which include:

1) Using a monomer of the hydrogel in aqueous solution wherein the porous substrate is immersed and the hydrogel polymerized in situ with various techniques known in the art, such as radical polymerization. A suitable radical polymerization initiator and a catalyst for the radical polymerization can be selected from the groups of known radical polymerization initiators and catalysts. Preferable radical polymerization initiators and preferable catalysts are those that are water soluble and those that can be substantially homogeneously dispersed in water. Non-limiting examples include a water soluble peroxide, such as potassium peroxidisulfate and ammonium peroxidisulfate; water soluble azo compounds non-limiting examples of which include azo-bis-isobutyrate imidazoline hydrochloride (commercially available as VA-044), 2,2'-azobis(2-methylpropionamidine)-dihydrochloride (commercially available as V-50), both of which are available from and from Wako Chemicals Co. Ltd, and 4,4'-Azobis(4-cyanovaleric acid) which commercially available as V-501 from Sigma-Aldrich, was well as various other water soluble radical initiators having poly(ethylene oxide) chains.

Non-limiting examples of catalysts suitable for use herein include N,N',N'-tetramethylethylenediamine and β-Dimethylaminopropionitrile. The polymerization temperature is optionally set to a range of 0° C. to 100° C. in conformity with the selected initiator and catalyst, and which is within the skill of those having ordinary skill in the art. The polymerization time, also, will vary with the type of catalyst and initiator and polymerization conditions such as the amount of polymerizing solution (concentration), and the polymerization time periods are within a few seconds to hours. A preferred method of carrying out the polymerization is to make an aqueous solution of the hydrogel monomer, add an initiator to the solution, and then add the catalyst. The graphitic felt and substrate would be immediately immersed in this solution, such that polymerization takes place on the surfaces of the fibers.

2) Using the polymer in aqueous solution, the hydrogel can be crosslinked while the porous substrate is immersed in the solution. The crosslinking agent can be any suitable crosslinking agent for the particular polymer being immobilized. Crosslinking agents suitable for any particular hydrogel are well known in the industry. A typical crosslinking agent used for crosslinking thermogels is N,N'-methylene bisacrylamide (BIS). In a preferred embodiment of the present invention, the crosslinked hydrogel immobilized on the thermally and electrically conductive graphitic substrate as follows:

The porous substrate is immersed in the crosslinking agent solution via an incipient wetness method, which is well known in the art. The solution volume is sufficient to "soak" the fibrous substrate, without and flow of the aqueous solution out of the fiber. The concentration of the crosslinking agent is maintained at stoichiometric amounts required to achieve the final polymer. The temperature, pH and pressure is maintained at the known conditions for the formation of the particular hydrogels.

A solution of the hydrogel polymer is prepared and the functionalized porous substrate, preferably a graphitic felt substrate, with crosslinking agent is immersed in the solution. A final crosslinked polymer is formed in-situ on the porous substrate. A water rinse can be used to eliminate any excess hydrogel that is not crosslinked in an interpenetrating manner with the substrate.

3) Another means to immobilize the hydrogel onto the substrate is to prepare a solution of the hydrogel in water and deposit the solution on the porous substrate via a suitable incipient wetness technique. After the hydrogel is loosely deposited on the fibers of the porous substrate, an alumina sol solution is prepared and the porous substrate immersed in the solution. The alumina sol gel will fix the hydrogel to the felt fibers.

Figure 6:
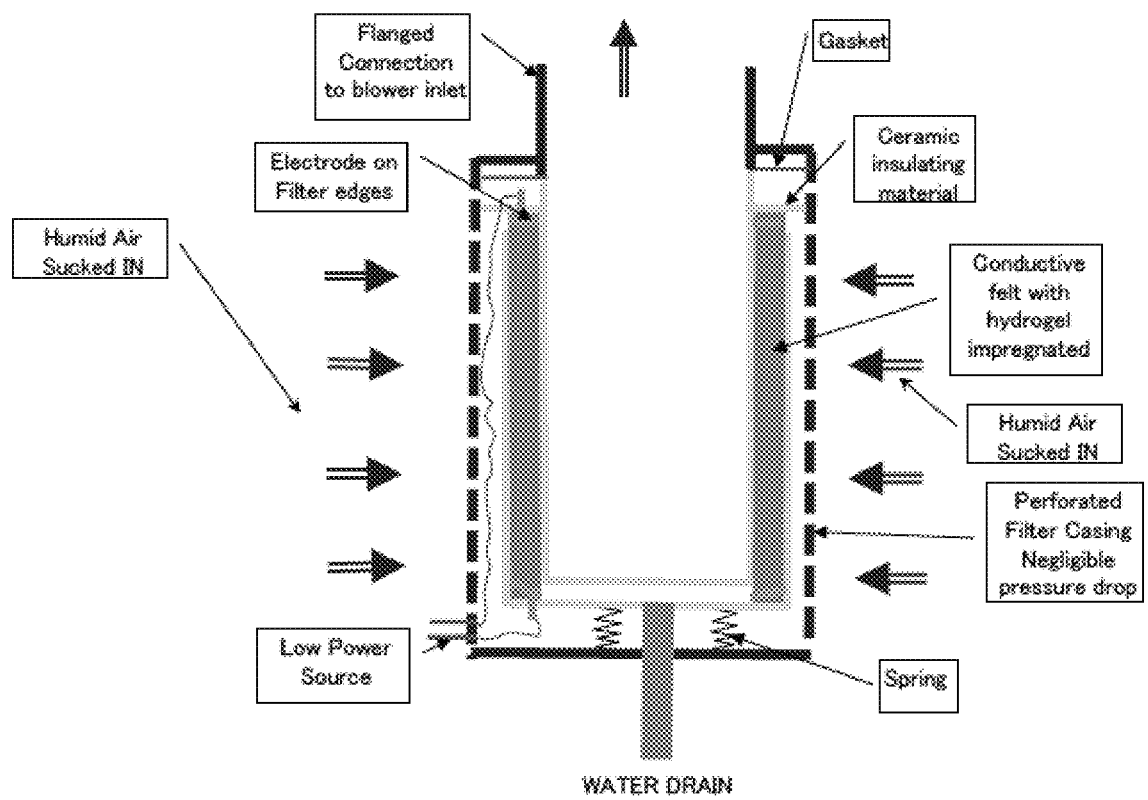
FIG. 6 hereof is a representation of a preferred embodiment of a cylindrical filter using the porous substrate of the present invention and electrodes to deliver a current to trigger the hydrogel to give up absorbed water.

The above methods of preparation will result in a sheet, or mat, of porous fibrous thermally/electrically conductive substrate similar to the media used for air filtration in HVAC systems. Reference is made to FIG. 5 hereof that shows an air conditioner unit containing a pair of cylindrical air filters each containing a composite porous fibrous dehumidifying structure of the present invention. These filters are positioned at the air input of the air conditioner unit. One filter will be in a moisture absorption mode while the other is in the regeneration mode after and giving up absorbed water as result of a predetermined external stimulus. FIG. 6 hereof shows more detailed view of a preferred cylindrical filter composed of the composite porous fibrous dehumidifying material of the present invention.

The fibrous substrate can then be provided with electrodes on two opposite edges. Such electrodes can be attached physically (for example nickel plated copper strips) or can be plated on the edge of the porous substrate by either electroplating or by electroless plating with nickel. The electrodes can then be connected to a suitable electrical switch that is in electrical communication with an airconditioning unit. In a preferred embodiment of this invention, there are two such hydrogel porous substrates in series. When one substrate is exhausted, it would be subjected to an electrical current to start the regeneration stage. In the meantime, moist air would continue to be sucked through it with no effect, since the hydrogel will be in regeneration mode, but the air can be dehumidified by the second substrate. The water obtained from the regeneration of each porous substrate will be collected or drained appropriately. These hydrogel-porous media can be configured with different OEMs to match their HVAC unit sizes, and will preferably be placed on the suction side of an air conditioning unit. Negligible pressure loss will result.

EXAMPLES

The following examples are presented for illustrative purposes only and should not be taken as limiting the instant invention in any way.

There are two levels of Relative Humidity (RH) used in the calculations to give a clear understanding of the range of energy savings that can be achieved:

Condition 1:
1) Air Input @ 90% RH
2) Temperature 75° F.
3) Water Vapor=120 grains/lb. of air
4) Heat capacity=37 BTU/lb. of dry air Condition 2:
1) Air input @ 55% RH.
2) Temperature=75° F.
3) Water Vapor=70 grains/lb. of air
4) Heat Capacity=29 BTU/lb. dry air Air Output:
1) Temperature=50° F.
2) Water Vapor=54 grains/lb. of dry air
3) Heat Capacity=20 BTU/lb. of dry air
4) Vapor Coil=45° F.
All the calculations below are based on removing water from 100 lbs. of air Calculating Total Energy Load for Dehumidification

Example 1 (Comparative)

System: Vapor Compression—
The most commonly used air conditioning systems:

$$Q_{total} = Q_{latent} + Q_{sensible}$$

TABLE I

| 90% RH | 55% RH |
|---|---|
| Latent Heat Energy | |
| $Q_{latent}$ to be removed (BTU) = Mass of Air × ($Q_{latent(in)}$ − $Q_{latent(out)}$) | |
| $\dfrac{(In-Out) \text{ grains}}{lb. \text{ of Dry air}} \times \dfrac{1 \text{ lb water}}{7000 \text{ grains}} \times \dfrac{100 \text{ lbs. of Dry air} \times 1000 \text{ BTUs}}{lb. \text{ of water evaporated}}$ | |
| ((120 − 54)/7000) × 100 × 1000 = 943 BTUs of latent heat to be removed | (70 − 54/7000) × 100 × 1000 = 229 BTUs of latent heat to be removed |
| Sensible Heat Energy To Take Dry Air From 75° F. to 50° F. | |

TABLE I-continued

| 90% RH | 55% RH |
|---|---|
| $Q_{sensible}$ to be removed (BTU) = Mass of Air (lbs.) × (Heat Capacity$_{(in)}$ − Heat Capacity$_{(out)}$) BTUs/lb. of air × ΔT (° F.) | |
| 100 lbs. × (0.24) BTUs/lb.-° F. × 25° F. = 600 BTUs of sensible heat to be removed | 100 lbs. × (0.24) BTUs/lb.-° F. × 25° F. = 600 BTUs of sensible heat to be removed |

Typical Coefficient Of Performance for vapor compression systems is 3.0, if operating at a coil temperature of 45° F.

TABLE II

| 90% RH | 55% RH |
|---|---|
| Energy required to remove heat load Sensible Heat + latent Heat Divided by Coefficient of Performance | |
| (600 + 943)/3 = 880 BTUs | (600 + 229)/3 = 643 BTUs |
| = 514 BTUs × | = 643 BTUs × |
| $\dfrac{1 \text{ KW-hr}}{3413 \text{ BTUs}}$ | $\dfrac{1 \text{ KW-hr}}{3413 \text{ BTUs}}$ |
| = 0.151 KW-hr | = 0.181 KW-hr |

Example 2 (Comparative)

System: Vapor Compression Air Conditioner Using Desiccant Wheel Dehumidifier—

System based on zeolites (such as hydrophilic alumina silicates, typically used as desiccants).

In this system, the latent heat from the phase change of the water vapor to liquid phase is passed on to the dehumidified air, raising its temperature.

1. Exit air temperature from the desiccant=94.2° F.
2. Water Vapor content of exit air=54 grains/lb. of air.
3. Specific Heat Capacity of desiccant=0.22 BTU/lb.-° F.
4. Specific Heat Capacity of air=0.24 BTU/lb.-° F.
5. Heat carryover=latent heat of vaporization of water.
6. Airstream cooled back to input airstream temperature (75° F.), which will require removal of latent heat that was transferred by the desiccant to the dehumidified air.
7. Coil temperature for the vapor compression based cooling system will be at 60° F.

TABLE III

| 90% RH | 55% RH |
|---|---|
| No Latent Heat Energy Required As Air Will be Dried By Dessicant Sensible Heat Energy To Take Dry Air From Higher Dry air Temperature will be the amount of latent heat in each RH condition plus the sensible heat calculated before for a 75° F. to 50° F. temperature drop | |
| $Q_{sensible}$ to be removed (BTU) = [Mass of Air (lbs.) × (Heat Capacity$_{(air)}$) BTUs/lb. of air × ΔT (° F.)] + Latent Heat generated by Dessicant and carried over to the air | |
| 100 lbs. × (0.24) BTUs/lb.-° F. × 25° F. = 600 + 943 (Latent Heat) = 1,400 BTUs of sensible heat to be removed | 100 lbs. × (0.24) BTUs/lb.-° F. × 25° F. = 600 + 229 (Latent Heat) = 830 BTUs of sensible heat to be removed |

Typical Coefficient Of Performance for vapor compression systems is 4.0, if operating at a coil temperature of 60° F.

TABLE IV

| 90% RH | 55% RH |
|---|---|
| Energy required to remove heat load Sensible Heat + latent Heat Divided by Coefficient of Performance | |
| 1400/4 = 350 BTUs | 830/4 = 208 BTUs |
| = 350 BTUs × $\dfrac{1 \text{ KW-hr}}{3413 \text{ BTUs}}$ | = 208 BTUs × $\dfrac{1 \text{ KW-hr}}{3413 \text{ BTUs}}$ |
| = 0.103 KW-hr | = 0.061 KW-hr |

In this system, one must consider the energy required to regenerate the desiccant. Very few installations have available waste heat at such high temperatures.

Desiccant regeneration energy (theoretical) required would be the latent heat required for the absorbed water to be vaporized.

Energy conversion efficiency of energy source to heat is taken at 90%.

TABLE V

| 90% RH | 55% RH |
|---|---|
| Energy required to evaporate water from dessicant | |
| 943/0.9 = 1,048 $BTU_{th}$ | 229/0.9 = 255 $BTU_{th}$ |

Example 3

System: Vapor Compression Air Conditioner Using Rapid Kinetics Reversible Hydrogel of Present Invention.

Input and output requirements assumed to be same.

Gel absorbs 50% of its weight in water.

2.0 lbs. of gel needed per lb. of water.

Gel Specific Heat Capacity=0.6 BTU/lb.-° F. (measured data)

Gel temperature rise per lb. of water=9° F. (measured)

The carryover heat in this case will be the slight exothermic nature of gel "expansion" when the water vapor deliquesces it.

Cooling by conventional vapor compression remains the same with a COP of 4.0 at a coil temperature of 60° F.

TABLE VI

| 90% RH | 55% RH |
|---|---|
| No Latent Heat Energy Required As Air Will be Dried By Gel We will need to provide the energy to cool the air from the inlet to outlet condition, and also provide the energy to cool the slight amount of heat generated due to an exothermic nature of gel expansion. | |

$Q_{sensible}$ to be removed (BTU) = $\left[ \begin{array}{c} \text{Mass}_{air} \text{ lbs} \times \\ \text{Heat Capacity}_{(air)} \text{ BTUs/lb}_{air} \times \\ \Delta T_{air}(° \text{F.}) \end{array} \right]$ +

Mass of gel (lbs.) ×

Heat Capacity of Gel (BTU/$lb_{gel}$-° F.) ×

$\Delta T_{gel}$ ° F. $\left( \begin{array}{c} \text{Heat generated by Gel and} \\ \text{carried over to the air} \end{array} \right)$ = [100 lbs. × 0.24 BTUs/$lb_{air}$ × 25(° F.)] +

2 (lbs.) × 0.6 BTU/$lb_{gel}$-° F. × 9° F.

= 612 BTUs

TABLE VI-continued

| 90% RH | 55% RH |
|---|---|
| Electrical Energy = 612/4 | Virtually same in all realistic RH conditions |
| = 153 BTUs × $\dfrac{1 \text{ KW-hr}}{3413 \text{ BTUs}}$ | |
| = 0.045 KW-hrs | |

CYCLE LENGTH CALCUATION:

$Capacity_{gel}$ = 0.5 $lbs_{water}$

Humidity removed under 90% RH conditions Per 100 lbs. of AIR:

(120 – 54) grains × $\dfrac{1 \text{ lb.}}{7000 \text{ grains}}$ =

0.00943 lbs. 0.5 lbs water ÷ 0.00943 lbs per cycle =

53 times the base amount of 100 lb of air used in this example.

Thus the energy consumption is divided by this number for a per 100 lb air calculation.

Regeneration of the 2 lb. of gel takes 20 minutes (1/3 hr) of 2 amps × 220 V current.

Total energy consumed = 440 watts/3

= 113 watt hour.

= 113 watt-hrs/53 cycles

= 0.002 KW-hrs for the example above.

Total Energy consumed = 0.002 + 0.0045 KW-hrs

= 0.047 KW-hrs.

The invention claimed is:

1. A composite porous fibrous dehumidifying material for use with HVAC equipment, which material is comprised of a plurality of electrically conductive fibers having immobilized thereon a reversible hydrogel material that is capable of absorbing water by forming bonds with water molecules from moisture-containing air and which is capable of releasing at least a fraction of the absorbed water upon being subjected to an electrical current.

2. The composite porous fibrous dehumidifying material of claim 1 wherein the fibers are graphic.

3. The composite porous fibrous dehumidifying material of claim 1 wherein from about 0.1 to 50% of the surface of the electrically conductive fibers contains said immobilized reversible hydrogel.

4. The composite porous fibrous dehumidifying material of the claim 1 wherein the thickness of said immobilized reversible hydrogel on said electrically conductive fibers is from about 0.01 to about 1000 microns.

5. The composite porous fibrous dehumidifying material of claim 1 wherein the reversible hydrogel has a lower critical solution temperature of from about 25° C. to about 100° C.

6. The composite porous fibrous dehumidifying material of claim 1 wherein the hydrogel is selected from the group consisting of poly(vinyl methyl ethers); N,N-Diethyl acrylamide copolymers; acrylamides (N-alkyl or N-alkalene substituted); methacrylamides, such as poly(methacrylamideopropyl-methoammoniumchlorides); poly(acrylamide), poly(N-methylacrylamide), poly(N- ethylacrylamide), poly(cyclopropylacrylamide), poly(N-isopropylacrylamide), poly(methacrylamide), poly(N-methylmethacrylamide), poly(cyclopropylmethacrylamide), poly(N-isopropylmethacrylamide), poly(dimethylacrylamide), poly(N,N-dimethylaminopropylacrylamide, poly(N-methyl-N-ethylacrylamide), poly(N-methyl-N-isopropylacrylamide), poly(N-methyl-N-ethylacrylamide), poly(N-methyl-N-isopropylacrylamide), poly(N-methyl-N-n-propylacrylamide), poly(N,N-diethylacrylamide) poly(N-acryloylpyrrolidine), poly(N-acryloylpiperidine), poly(N-acryloylmethylhomopiperidine), poly(N-acryloylmethylpiperidine), and poly(N-acryloylmethylpiperidine).

7. The composite porous fibrous dehumidifying material of the claim 1 which is in the form of a rectangular mat having a first electrode secured along one of its sides and a second electrode secured to its opposing side, which electrodes are capable of delivering an electrical current to said electrically conductive fibers.

* * * * *